June 5, 1923.
T. NAMURA
PUMP
Filed June 29, 1921
1,457,546
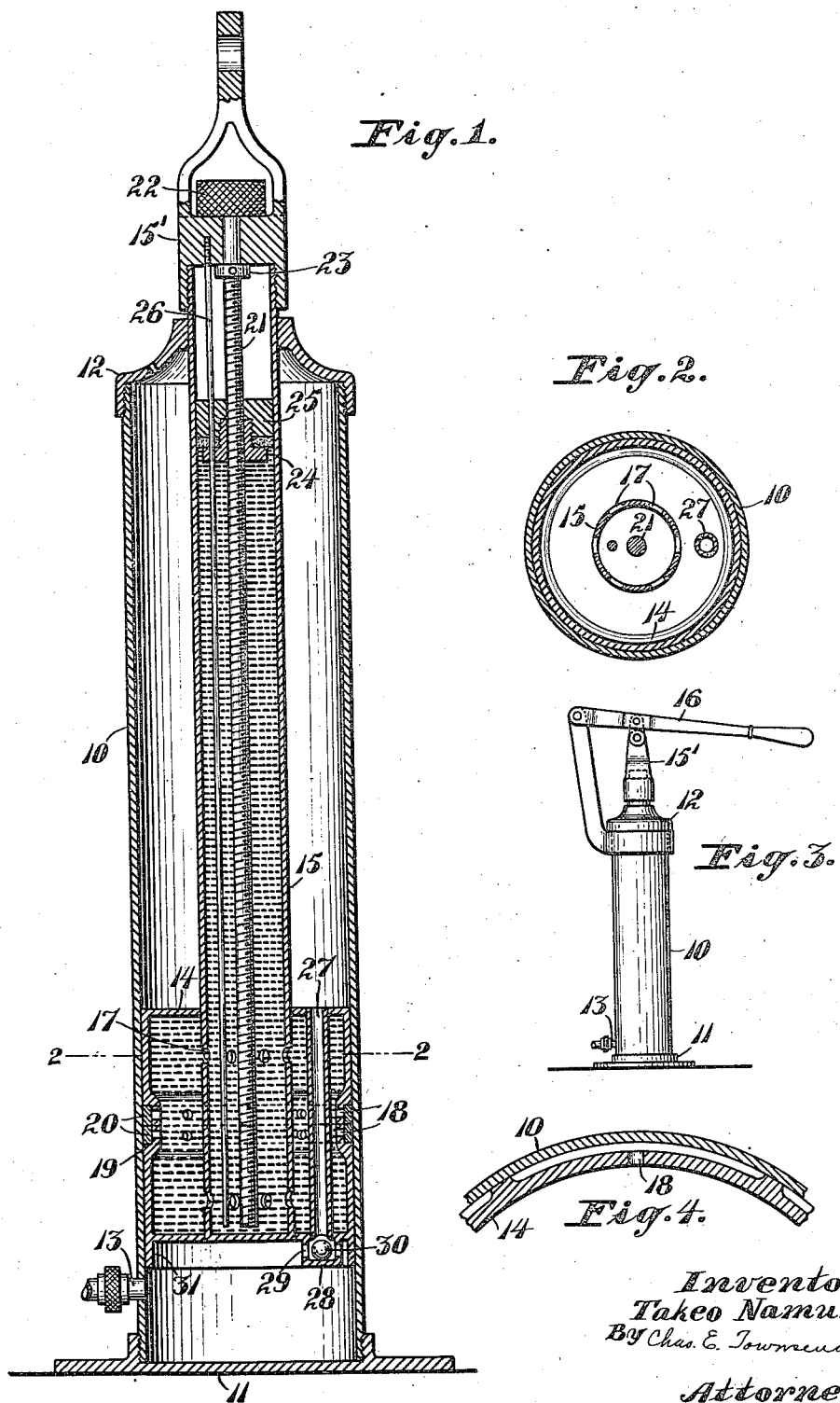
Inventor
Takeo Namura
By Chas. E. Townsend
Attorney Patented June 5, 1923.

1,457,546

UNITED STATES PATENT OFFICE.

TAKEO NAMURA, OF WALNUT GROVE, CALIFORNIA.

PUMP.

Application filed June 29, 1921. Serial No. 481,243.

*To all whom it may concern:*

Be it known that I, TAKEO NAMURA, a citizen of the Empire of Japan, residing at Walnut Grove, in the county of Sacramento and State of California, have invented new and useful Improvements in Pumps, of which the following is a specification.

This invention relates to a pump and particularly pertains to a means for packing and oiling the same.

It is a principal object of the present invention to provide a pump having liquid means for packing the piston within the pump cylinder, to form a seal therebetween and for lubricating the piston, all of which mechanism is simple in construction and may be readily operated to produce the results desired.

The present invention contemplates the use of a piston cylinder carrying a reciprocating piston which piston is fitted with means adapted to form a seal with the cylinder wall by an adjustable liquid pressure, said liquid being also used to lubricate the piston.

The invention is illustrated by way of example in the accompanying drawings in which—

Fig. 1 is a view in central longitudinal section through a pump embodying the present invention;

Fig. 2 is a view in transverse section through the pump as shown on the line 2—2, Fig. 1;

Fig. 3 is a view showing in diagram an application of the present invention;

Fig. 4 is an enlarged fragmentary view in transverse section showing the manner in which the piston is formed when piston rings are not required.

Referring more particularly to the drawings, 10 indicates a tubular pump cylinder which cylinder is closed at its lower end by a cap 11 and at its upper end by a cap 12. Leading from the lower end of the cylinder is an outlet pipe 13. Reciprocating within the cylinder is a hollow piston 14. This piston is secured to a tubular piston rod 15 which extends through an opening in the cap 12. Secured to the upper end of piston rod is a fitting 15. This member may be provided to receive the end of a pump lever 16, or may be formed with a handle grip, as commonly used on tire pumps. It will also be understood that the present invention is not limited to the use of a small pump, but that the same structure might be embodied in the construction of large power driven pumps.

The portion of the piston rod 15 extending through the hollow piston 14 is formed with a plurality of perforations 17. These perforations permit a liquid, such as oil, to circulate through the rod and into the piston. The wall of the piston is also formed with a plurality of perforations, as indicated at 18. These perforations preferably occur in the back wall of the piston ring grooves 19, thus outward pressure of the liquid will act against the piston rings 20 to force them outwardly and prevent leakage between the piston and the cylinder.

Extending longitudinally of the piston rod 15 and centrally thereof is a threaded screw 21. This screw is rotatably mounted through the member 15 and is provided with an operating nut 22. A stop collar 23 is carried by the screw to prevent longitudinal movement thereof. A threaded nut 24 is carried upon the screw, and this in turn supports a piston 25. Thus, when the stem is rotated the nut and piston will move along the piston rod, it being understood that the piston member 25 fits snugly within the tubular bore of the rod.

In the present instance, the bore of the piston rod is shown as circular in section, and for that reason a guide rod 26 is used to prevent rotation of the nut 24. This guide rod is secured by one end to the fitting 15 and extends through the piston rod and parallel to the screw 21. It is desirable that the fitting 15 shall be removably secured to the upper end of the piston rod, and for that reason these parts are screwed together, as shown in Fig. 1. An air by-pass tube 27 extends through the piston and longitudinally thereof. The lower end of this tube terminates within a valve cage 28 carried on the working end of the piston. This valve cage is formed with air passageways 29, while within the cage a ball valve 30 is used. On the pressure stroke of the piston this valve will close the air passageway 27, and on the return stroke will move away from the passageway to permit the flow of air through the piston. The working end of the piston is flanged, as indicating end of the piston, as indicated at 31, to protect the valve cage and to prevent damage to the end of the cylinder head.

In the operation of the present invention, the piston and a considerable length of the tubular piston rod are filled with lubricating oil, or some other desired liquid. The piston is inserted within the cylinder 10, after which the cap 12 is placed in position. If the piston does not fit properly, the screw 21 may be rotated to force the pressure piston 25 along and within the piston rod and toward the main piston 14. This will cause the liquid to be forced outwardly through the openings 17 in the piston rod and the opening 18 in the piston. The pressure will thus expand the piston rings and produce a tight fit between them and the cylinder wall. A small amount of liquid will work its way between the rings and will be distributed along the cylinder wall as the piston reciprocates. A movement of the piston toward the cylinder head 11 will cause the valve member 30 to close the air by-pass 27, while a retraction of the piston will open this valve and permit the piston to freely move.

In the form of the device shown in Fig. 4, the piston rings are eliminated. In this case grooves are formed in the outer face of the piston wall to extend partially therearound. These grooves communicate with the perforations 18, thus making it possible for a lubricant, under pressure, to be forced out into the grooves and to form a seal with the cylinder. It is to be understood that while lubricating oil has been mentioned, it might be found advisable to use grease, heavy oil, or other liquids and semisolids.

It will thus be seen that in the pump here disclosed simple means are provided for creating a desired fit between a piston and its cylinder, and at the same time lubricating the moving parts.

While I have shown the preferred form of my invention, it is to be understood that various changes may be made in the device by those skilled in the art without departing from the spirit of the invention.

Having thus described my invention, what I claim and desire to secure by Letters Patent is:

1. A pump comprising a cylinder; a piston reciprocal therein; a fluid compartment within said piston and having outlet openings passing through the side walls of the piston; piston rings circumscribing the piston and covering said openings; a tubular piston rod connected with the piston and communicating with the fluid compartment therein; and means within said piston rod for giving fluid in said compartment a desired pressure.

2. A pump comprising a cylinder; a hollow piston reciprocal within said cylinder, said piston being formed with a lubricating chamber having outlet openings through the side walls of the piston; piston rings circumscribing the piston and covering said openings; a tubular piston rod rigidly secured to the piston and communicating with the lubricating chamber, said rod adapted to be partially filled with a liquid lubricant; and a piston adjustably secured within said tubular rod to create a desired pressure upon the lubricant.

3. A pump comprising a cylinder; a hollow piston reciprocal within said cylinder, said piston being formed with a lubricating chamber having outlet openings through the side walls of the piston; piston rings circumscribing the piston and covering said openings; a tubular piston rod rigidly secured to the piston and communicating with the lubricating chamber, said rod adapted to be partially filled with a liquid lubricant; a longitudinally extending adjusting screw rotatably supported within said piston rod; means for rotating the same; and a threaded piston carried by said screw and adapted to create a desired pressure upon the liquid within the rod and the chamber of the piston.

4. A pump comprising a cylinder; a hollow piston reciprocal within said cylinder, said piston being formed with a lubricating chamber having outlet openings through the side walls of the piston; piston rings circumscribing the piston and covering said openings; a tubular piston rod rigidly secured to the piston and communicating with the lubricating chamber, said rod adapted to be partially filled with a liquid lubricant; a longitudinally extending adjusting screw rotatably supported within said piston rod; means for rotating the same; a threaded piston carried by said screw and adapted to create a desired pressure upon the liquid within the rod and the chamber of the piston; and means for preventing rotation of the threaded piston.

5. A pump comprising a cylinder; a hollow piston reciprocal within said cylinder, said piston being formed with a lubricating chamber having outlet openings through the side walls of the openings; a tubular piston rod rigidly secured to the piston and communicating with the lubricating chamber, said rod adapted to be partially filled with a liquid lubricant; a longitudinally extending adjusting screw rotatably supported within said piston rod; means for rotating the same; a threaded piston carried by said screw and adapted to create a desired pressure upon the liquid within the rod and the chamber of the piston; means for preventing rotation of the threaded piston; and a valve controlling the by-pass through the piston.

TAKEO NAMURA.